United States Patent [19]

Nagano et al.

[11] 4,221,611
[45] Sep. 9, 1980

[54] NON-FUSED FLUX COMPOSITION FOR SUBMERGED-ARC WELDING

[75] Inventors: Kyoichi Nagano, Kamakura; Toshihiko Takami, Ebina; Kunio Koyama, Machida, all of Japan

[73] Assignee: Nippon Steel Corporation, Tokyo, Japan

[21] Appl. No.: 962,568

[22] Filed: Nov. 16, 1978

[30] Foreign Application Priority Data

Jul. 17, 1978 [JP] Japan .................................. 53-86899

[51] Int. Cl.² .............................................. B23K 35/34
[52] U.S. Cl. ...................................................... 148/26
[58] Field of Search .......................................... 148/26

[56] References Cited

U.S. PATENT DOCUMENTS

| 2,823,112 | 2/1958 | Miller | 148/26 |
| 3,023,133 | 2/1962 | Lewis | 148/26 |
| 4,017,339 | 4/1977 | Okuda | 148/26 |

OTHER PUBLICATIONS

F. R. Coe, "Research Report: Fluxes and Slags in Arc Welding," The Welding Institute, pp. 13–16 (Nov., 1978).

*Primary Examiner*—P. D. Rosenberg
*Attorney, Agent, or Firm*—Wenderoth, Lind & Ponack

[57] ABSTRACT

Non-Fused flux composition particularly suitable for horizontal submerged-arc welding in production of welded structures such as storage tanks and pressure vessels, comprising 13 to 30% $TiO_2$, 5 to 50% $CaF_2$, 20 to 40% MgO, 12 to 30% $Al_2O_3$, 2 to $[20-(\% CaF_2)\div 3]\%$ $SiO_2$, 0.1 to 1.0% $B_2O_3$, and providing good low temperature fracture toughness of weld metal.

3 Claims, 6 Drawing Figures

NON-FUSED FLUX COMPOSITION FOR SUBMERGED-ARC WELDING

BACKGROUND OF THE INVENTION

1. Field of the Invention

The present invention relates to non-fused flux compositions for submerged-arc welding which is performed in various welding positions, more particularly welding flux compositions which are suitable for horizontal submerged-arc welding in production of welded structures such as storage tanks and pressure vessels, and assure good low-temperature fracture toughness of weld material.

Submerged-arc welding is very often used for its high efficiency to achieve horizontal welded joints in welded structures, such as cylindrical tanks, spherical tanks, iron and steel making equipments, such as blast furnaces, hot stoves, reaction vessels in the chemical industry and containers for nuclear reactors.

Meanwhile, in recent years, increased care has been taken with respect to the safety aspect of these steel structures on the basis of the conceptions of fracture mechanics concerning generation of embrittlement fracture, and it is now almost a requisite to assure fracture toughness for these structures. For example, welded joints in LPG (liquefied petroleum gas) tanks have conventionally been specified only by the absorption energy determined by Charpy impact tests, but now they are specified also in respect of the critical COD (Crack Opening Displacement) value, and it is necessary to satisfy the critical COD value.

The horizontal submerged-arc welding, as compared with the welding, in flat position, is limited in the groove opening angle so that slag formed during welding is hard to be detached, and weld beads, due to their gravity, tend to be thin in the upper portions and thick in their lower portions and pock marks and undercuts often occur on the upper side while overlaps and drop through and internal defects such as slag entrappment, pits and blow holes often occur on the lower side.

Further, when a multiple-layer welding is performed using a direct current electric source with a small current, the oxygen content in the resultant weld metal markedly increases and when the welding is performed with an alternating current, the nitrogen content in the weld metal increases, so that it is not possible to obtain good toughness of the weld metal in both cases.

2. Description of Prior Art

Most of conventional flux compositions for submerged-arc welding, particularly fused flux compositions, contain $SiO_2$ and $MnO$ as main components in order to assure feasibility of their production, and their satisfactory easiness in melting, but these components are unstable oxides which are easily dissociated into oxygen and metals when they are brought into contact with the high-temperature welding arc, so that the slag detachability becomes difficult due to the intersurface energy between the weld metal and the slag, the weld metal tends to entrap the slag and the oxygen content in the weld metal increases, thus lowering the toughness of the weld metal. These problems of the conventional flux compositions are even greater when they are used in horizontal welding operations.

In order to overcome the above problems, flux compositions disclosed in Japanese Patent Publication No. Sho 40-18410, Japanese Patent Publication No. Sho 52-19815 or Japanese Laid-Open Patent Application No. Sho 50-62832 may be used, but it has been found that these flux compositions do not satisfy all of the required Charpy impact value of welded joints, the required critical COD value and the required welding performance in the welded structures as mentioned before where these requirements have been increasingly severe.

For example, the flux composition disclosed in the Japanese Patent Publication No. Sho 40-18410 is designed so as to satisfy both of the required Charpy impact value and the required welding performance, but since the content of $SiO_2$ is maintained low, and considerable amounts of $TiO_2$ and $CaO$ are admixed, the slag detachability is deteriorated by the slag sticking to the bead surface due to the precipitation of a high-melting-point complex oxide ($CaOTiO_2$). Further, although the Charpy impact value at 0° C. is good as the oxygen content in the weld metal lowers, the Charpy impact value sharply decreases at sub-zero temperatures because the micro-structure of the weld metal is not refined so that no practical utility is assured.

Also the flux composition disclosed in the Japanese Patent Publication No. Sho 52-19815 does not provvide a satisfactory stability of the arc, so that bead shapes are markedly disordered, and this flux composition can provide only low values for the Charpy impact value and the critcial COD value at low temperatures.

Further, the flux composition disclosed in the Japanese Laid-Open Patent Application No. Sho 50-62832 can assure to a certain degree the required Charpy impact value at low temperatures, but it contains Ti and B in such a simple manner that the amount of $TiO_2$ is small, resulting in an insufficient concentration of Ti, and the resultant weld metal is not sufficiently lowered in its oxygen content so that the addition of Ti and B does not fully contribute to the refinement of the weld metal micro-structure and a good critical COD value at low temperatures can not be obtained.

DETAILED DESCRIPTION OF THE PRESENT INVENTION

The present invention will be described referring to the attached drawings.

BRIEF EXPLANATION OF THE DRAWINGS

The present inventors have conducted various, basic experiments for development of new flux compositions in a completely different approach from that done for the conventional flux compositions. The results of the experiments are illustrated in FIG. 1 and FIG. 2. FIG. 1 shows the relation between the contents of oxygen in the weld metal and the contents of $CaF_2$ and $MgO$ in the flux composition. For obtaining the results shown in FIG. 1, the following experiments have done.

First, in the flux composition of $CaF_2$—MgO—$Al_2O_3$—$TiO_2$—$SiO_2$, the weight ratio among $Al_2O_3$, $TiO_2$ and $SiO_2$ is set as $Al_2O_3:TiO_2:SiO_2=4:4:1$ and the amounts of $CaF_2$ and MgO are changed respectively in the range from 0 to 50% and in the range from 16 to 40% to prepare 40 samples of the flux composition. Then a horizontal submerged-arc welding was performed by the bead on plate on a welding structural steel using the above prepared flux compositions in combination with a welding wire of 3.2 mm in diameter containing 1.5% Mn. The welding current source was of direct current reversed polarity type, and the welding conditions were: current density: 350 A, voltage: 27–28 V, and welding speed: 50 cm/min.

Figure 1:
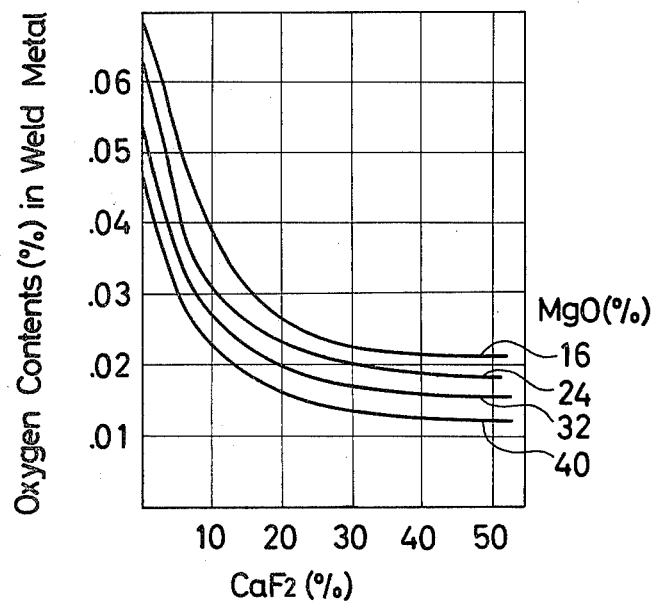
FIG. 1 is a graph showing the relation between the contents of oxygen in the weld metal and the contents of $CaF_2$ and $MgO$.

Samples were taken from the weld metals thus obtained and analyzed by a vacuum melting method to determine their oxygen contents. The relation between the oxygen contents in the weld metals and the amounts of $CaF_2$ and MgO in the flux compositions was adjusted to obtain the results shown in FIG. 1. According to the results, the oxygen content in the weld metal lowers as the amount of $CaF_2$ increases, but it remains almost constant when the amount of $CaF_2$ is 26% or higher. Also it is understood from the results that the oxygen content lowers as the amount of MgO increases.

Figure 2:
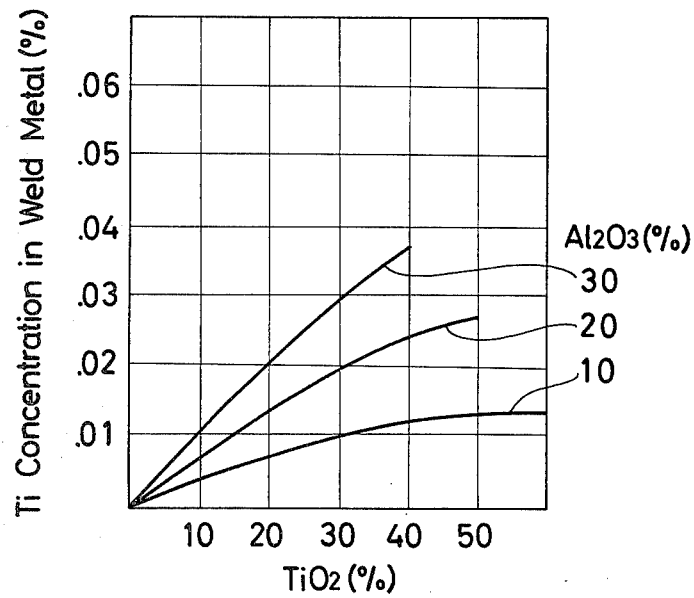
FIG. 2 is a graph showing the relation between the Ti concentration in the weld metal and the contents of $TiO_2$ and $Al_2O_3$ in the flux compostion.

FIG. 2 shows the relation between the Ti concentration in the weld metal and the amounts of $TiO_2$ and $Al_2O_3$ in the flux composition.

In order to obtain the results shown in FIG. 2, the following experiments were conducted.

In the flux composition of $CaF_2$—MgO—$Al_2O_3$—$TiO_2$—$SiO_2$, the ratio among $CaF_2$, MgO and $SiO_2$ was set as $CaF_2:MgO:SiO_2=4:5:1$, and $TiO_2$ and $Al_2O_3$ contents were changed respectively in the range from 0 to 60% and in the range from 10 to 30% to prepare 30 samples of the flux composition.

Welding was performed under the same conditions as set forth hereinabove using those flux compositions. Samples were taken from the weld metals by drilling were subjected to quantative determination of Ti. The relation between the Ti concentrations in the weld metals and the amounts of $TiO_2$ and $Al_2O_3$ in the flux compositions was adjusted to obtain the results shown in FIG. 2.

As understood from the results, the Ti concentration in the weld metal increases as the amount of $TiO_2$ in the flux composition increases, and also increases as the amount of $Al_2O_3$ increases. The reason why the Ti concentration in the weld metal increases as the amount of $Al_2O_3$ increases is that the melting point of the flux composition is lowered by the increased amount of $Al_2O_3$ in the flux composition, so that $TiO_2$ is activated and is easily dissociated into Ti and oxygen. Ti, in combination with a small amount of B, in the weld metal, has marked effect on the micro-structure of the weld metal, and if maintained in an appropriate range it can improve the Charpy impact value at low temperature and the critical COD value.

Considering the above results in view of the welding performance as mentioned hereinafter and effects of individual flux components, the present inventors have found that excellent welding performance and welded joints having good Charpy impact values at low temperatures can be obtained by using the flux composition falling within the range as defined in the present invention.

Thus the non-fused type flux composition for submerged-arc welding according to the present invention comprises 13 to 30% $TiO_2$, 5 to 50%, preferably 10 to 26% $CaF_2$, 20 to 40%, preferably 24 to 40% MgO, 12 to 30%, preferably 12 to 28% $Al_2O_3$, $SiO_2 \leq [20 - (\% CaF_2) \div 3]$, preferably 3 to 9% $SiO_2$, and 0.1 to 1.0% $B_2O_3$, with the total amount of the above components being in the range from 70 to 97%.

For the purpose of obtaining a low-oxygen content Ti-B containing horizontal weld metal having good mechanical properties, particularly low-temperature toughness, the flux composition according to the present invention contains $TiO_2$ as a main component, together with $B_2O_3$, and Ti and B are transferred from the flux into the weld metal, the transfer of Ti is promoted by $Al_2O_3$ and the oxygen content in the weld metal is lowered by $CaF_2$ and MgO.

Also according to the present invention, the slag detachability in a narrow horizontal groove is facilitated by the synergistic effect of $TiO_2$ and $Al_2O_3$, the refractoriness of the flux is enhanced by MgO so as to prevent falling-down of the bead, and the shape and luster of the bead is improved by $Al_2O_3$ and $SiO_2$. Particularly, the content of $SiO_2$ is so restricted as to correspond to the content of $CaF_2$ so as to obtain a low oxygen content, whereby the required arc stability is maintained. $CaF_2$ is further effective to prevent the slag entrappment into the weld metal. In the present invention, therefore, contents of individual components of the flux composition are so defined as to produce a synergistic effect upon the quality of the resultant weld metal and the welding performance.

Hereinbelow explanations will be made on the reasons for the limitations of the contents of the flux components according to the present invention.

$TiO_2$ introduces titanium into the weld metal through the welding arc, and is an indispensable acidic component for improving the toughness of the weld metal and facilitating the detachability of the initial slag layer in a groove of narrow angle, particularly as in the horizontal welding operation, and also for smoothening the bead surface and reducing pock marks. However, when the $TiO_2$ content exceeds its upper limit of 30%, the titanium concentration in the weld metal becomes too high so that in the case of a multiple-layer welding, the weld metal is embrittled by the precipitation of titanium compounds caused by the reheating effect, and the viscosity of the slag becomes too low so that it is impossible to control the weld bead and the bead surface tends to be irregular.

On the other hand, when the content of $TiO_2$ is less than 13%, the shape and surface quality of the bead is deteriorated, and the slag sticks to the bead surface so that it is very difficult to detach the slag in the groove and it is impossible to obtain an enhanced toughness of the weld metal because of the insufficient titanium concentration.

As for the source of $TiO_2$ in the present invention, rutile sand, titanium flour, anatase and synthetic rutile prepared from ilumenite by removing the iron content therefrom may be used, and these sources are added in an amount of 13 to 30% on the basis of $TiO_2$.

$CaF_2$ is effective to lower the oxygen content in the weld metal, and the oxygen content lowers as the addition of $CaF_2$ increases, to promote the toughness improvement by titanium and boron, to remarkably increase the fluidity of the slag, to promote the separation of the slag from the molten steel during the welding operation, and to reduce the slag entrappment. The effects of CaF$_2$ in the flux have been recognized, and use of CaF$_2$ in conventional flux compositions composed mainly of SiO$_2$ has been tried to avoid a high oxygen content in the weld metal. However, as the content of CaF$_2$ exceeds 15%, the arc becomes unstable so that CaF$_2$ has not been effectively used and the content of CaF$_2$ has been generally limited to lower values. This problem has been solved by the present inventors by limiting the addition of SiO$_2$, and the conclusion has been reached that it is necessary to add CaF$_2$ in an amount not less than 5%, preferably not less than 10%, in order to effectively utilize the functions of CaF$_2$. However, with addition of CaF$_2$ beyond 50%, particularly 26%, in spite of the controlled addition of SiO$_2$, the arc will be unstable, causing arc breaking and wire extension, thus increasing the chance for slag entrappment, and further, the viscosity of the slag lowers excessively to cause drop through and overlaps. For these reasons, the content of CaF$_2$ is limited to the range from 5 to 50%, preferably 10 to 26%.

For the source of CaF$_2$ in the present invention, crude fluorite, refined fluorite, CaF$_2$-base flux powder, etc. may be used and added in an amount of 5 to 50%, preferably 10 to 26% calculated as CaF$_2$.

MgO is effective to increase the basicity of the slag, to prevent the increase of oxygen content in the weld metal, to increase the refractoriness of the flux, and particularly to prevent drop through of the horizontal bead, when MgO is present in an amount not less than 20%, preferably not less than 24%. With MgO contents exceeding 40%, the arc becomes unstable, causing slag entrappment in the weld metal and deteriorating the luster of the bead surface. For the source of MgO in the present invention, magnesia clinker bonded with silicates, magnesia clinker bonded with iron oxides, electro-fused magnesia, sea water magnesia, light burnt magnesia, or MgO-containing spinel may be added in an amount from 20 to 40% calculated as MgO.

Al$_2$O$_3$, when added in a large amount together with TiO$_2$, produces excellent synergistic effect, and is particularly effective to promote the transfer of titanium from TiO$_2$ to the weld metal and to improve the detachability of the initial slag layer in the groove. As mentioned hereinbefore, TiO$_2$ alone is effective to improve the detachability of the initial slag layer in the groove, but this improvement is markedly enhanced when Al$_2$O$_3$ is present with TiO$_2$. Also the amount of Ti reduced and transferred into the weld metal increases as the amount of Al$_2$O$_3$ increases with the same amount of TiO$_2$.

Al$_2$O$_3$ in the flux is also reduced during the welding and a small amount of Al is transferred into the weld metal. If an appropriate amount of Al is present in the weld metal, Al promotes the toughness improvement by titanium and boron. In addition, the lowering of the viscosity of the slag due to the addition of TiO$_2$ and the deterioration of the bead shape can be prevented by the addition of Al$_2$O$_3$, which can adjust the slag viscosity to a degree required for obtaining a good bead shape. Also the deterioration of the luster of the bead surface, which is often caused when a low-SiO$_2$ content flux composition is used, can be prevented when Al$_2$O$_3$ is present together with TiO$_2$.

For achieving the above effects, not less than 12% Al$_2$O$_3$ is required, but when the Al$_2$O$_3$ content in the flux composition exceeds 30%, more particularly 28%, the amount of Ti reduced from TiO$_2$ into the weld metal increases excessively so that the weld metal becomes brittle, and the Al concentration in the weld metal increases to increase the amount of ferrite in the microstructure thus causing embrittlement of the weld metal, and further the viscosity increases excessively, causing an unsatisfactory bead shape and difficulty in agglomeration of the flux composition.

As the source of Al$_2$O$_3$ in the present invention, industrial grade refined alumina, calcined bauxite, chamotte, murite clinker, andalustie, high-alumina cement etc. may be added in an amount from 12 to 30%, preferably 12 to 28% on the basis of Al$_2$O$_3$. Al$_2$O$_3$ may be added separately from MgO or may be added in the form of spinel [MgO.Al$_2$O$_3$].

SiO$_2$, which is an acidic component, is necessary for controlling the viscosity of the flux and for glassifying the slag so as to maintain a good luster of the bead surface. SiO$_2$ is unavoidably introduced from other flux materials and binding agents, and is normally contained in an amount of at least 2%. However, when a horizontal multiple-layer welding is performed with a direct current reversed polarity using a flux composition containing a large amount of SiO$_2$, the oxygen content in the weld metal increases markedly, thus deteriorating the toughness of the weld metal. Further, when SiO$_2$ is present together with a large amount of CaF$_2$, the arc cavity varies severely so that the arc is not stabilized and the bead shape is damaged considerably. Also pock marks are very likely to occur.

The maximum content of SiO$_2$ which can avoid the above problems varies depending on the content of CaF$_2$. Thus the maximum content of SiO$_2$ is 3.3% when the content of CaF$_2$ is at its upper limit of 50%, and it is 18.3% when the content of CaF$_2$ is at its lower limit of 5%. The correlation between the SiO$_2$ content and the CaF$_2$ content is a linear relation and can be expressed by the formula:

$$(\% \ SiO_2) \leq [20 - (\% \ CaF_2) \div 3]$$

Thus, the upper limit of the SiO$_2$ content is [20−(% CaF$_2$)÷3%.

More definitely and preferably, the upper limit of the SiO$_2$ content is 9%.

According to the present invention, good welding performance can be obtained with such a low SiO$_2$ content as above defined, because 13 to 30% TiO$_2$ as an acidic component, and 12 to 30%, preferably 12 to 28% Al$_2$O$_3$, for adjusting the slag viscosity, are contained.

As the source of SiO$_2$ in the present invention, silica sand, wollastonite, potassic feldspar, etc. may be added in the amount defined above and calculated as SiO$_2$.

When B$_2$O$_3$ is present in the flux composition in an amount not less than 0.1%, boron is transferred into the weld metal and the boron thus transferred contributes to uniformly refine the micro-structure of the weld metal in cooperation with titanium and markedly improves the Charpy impact value and the COD property. However, when an excessive amount of boron is present in the weld metal, is favourable effect on the toughness of the weld metal is reduced, and it increases the chance of hot cracking of weld metal. Therefore, the upper limit of B$_2$O$_3$ is set at 1.0%.

As the source of B$_2$O$_3$, boric acid, borax, colemanite, tourmaline, borosilicate glass, danburite, kotoite, suanite, etc. may be added in an amount from 0.1 to 1.0% on the basis of B$_2$O$_3$.

It has been found that when the total sum of the above main components is less than 70%, the desired integrated effect of the flux as a whole can not be obtained, and thus welded joints having improved low-temperature fracture toughness and good bead shape can not be obtained, but rather, the welded joints will have internal defects.

Meanwhile, impurities, deoxidizing and binding agents, etc. are unavoidably introduced into the flux composition from the minor flux materials in an amount greater than 3%. Therefore, the total content of the above main components will not exceed 97%. Thus the range of the total content of the main components is from 70 to 97%.

As the minor components other than the above main components, a binding agent such as alkali silicates, for example, sodium silicate, potassium silicate and lithium silicate; an arc stabilizer such as carbonates of Ca, Ba, Sr, Na, K and Mn; fluorides of Mg, Al and Si; oxides and fluorides of Zr, K, Na and Li; iron power; and deoxidizing and alloying agents such as metal powders, for example, Si, Mn, Ni, Mo and Cr, their alloys and their iron alloys, may be selectively added to the flux composition in an amount not greater than 30%. These minor components are added to the flux composition and remain therein after drying and firing of the flux composition.

Addition of carbonates of Ca, Ba, Sr, Na, K and Mn is effective to improve the arc stability and reduce the hydrogen absorption of the weld metal, but on the other hand, gases generated by the thermal decomposition of the compounds caused by the arc heat will often cause pock marks. Therefore, it is desirable that the amount of these carbonates to be added to the flux composition is maintained at 7% or less by weight on the basis of the total flux composition. Particularly, when $CaCO_3$ is added in an amount exceeding 15%, it reacts with $TiO_2$ to form $CaOTiO_2$ which has a high melting point and easily precipitates on the bead surface, thus degrading the detachability of the slag.

A small amount of CaO in the form of $CaSiO_3$ may be added for improving the fluidity of the slag and the arc stability, but the amount of CaO to be added is determined depending on the amount of $SiO_2$ to be added.

Addition of manganese oxide, manganese silicate, manganese dioxide, manganese slag and manganese carbonate increases the manganese concentration in the weld metal and improves the toughness of the weld metal, but these compounds tend to cause pock marks, increase the oxygen content in the weld metal and worsen the detachability of the slag. Thus, the addition of these compounds should be preferably maintained at not more than 5% calculated as MnO.

Further, fluorides of Mg, Al and Si, oxides and fluorides of Zr, K, Na and Li, iron powder and alloy powder may be added in a small amount for the purpose of stabilizing the arc. Still further, metals and alloys of Si, Mn, Mo and Cr, or ferro alloys of these elements may be added as alloying and deoxidizing agents, depending on the grades of weld metals, in an amount not greater than 30%.

For the preparation of the flux composition according to the present invention, if the whole of the flux composition is fused previously, the support of the bead is weakened, thus causing an unstable arc, and increasing the amount of diffusible hydrogen in the welds. That is particularly true in the case of a horizontal welding.

Therefore, the preparation of the flux composition according to the present invention is limited to a non-fused type. Thus, the mixture of powders of the starting materials is agglomerated with use of binder and baked, or the whole mixture is sintered at high temperatures and then crushed into a desired particle size.

Figure 3:
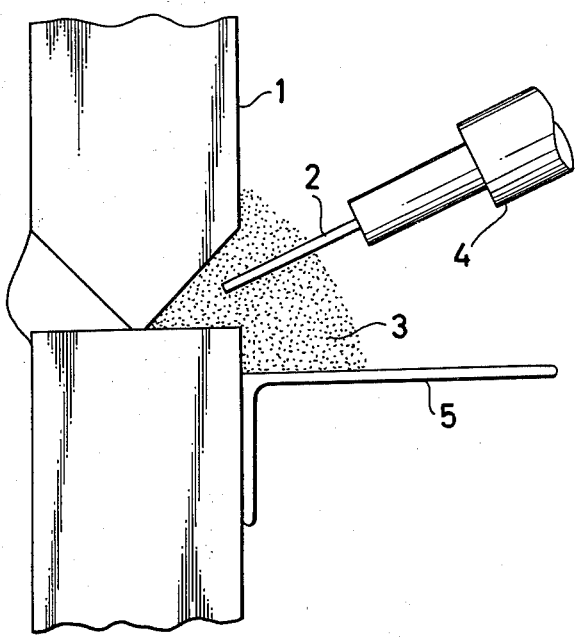
FIG. 3 shows schematically the horizontal welding operation using the flux composition according to the present invention.

As mentioned hereinbefore, the flux composition of the present invention is most advantageous when it is used in horizontal submerged-arc welding. FIG. 3 shows schematically how the flux is applied in a horizontal submerged-arc welding. In the drawing, (1) represents the steel plates to be welded, (2) represents a welding wire, (3) represents flux, (4) is an electrode holder, and (5) is a slidable support plate.

Naturally, the flux composition according to the present invention is also applicable to a welding in flat position with less restriction or to a horizontal fillet welding of complete penetration type.

DESCRIPTION OF PREFERRED EMBODIMENTS

The present invention will be more clearly understood from the following embodiments.

EXAMPLE 1

An Al-killed steel for low-temperature application of 30 mm in thickness having a chemical composition and mechanical properties as shown in Table 1 was subjected to a three-pass multiple horizontal welding on both sides under the welding conditions set forth below using wires (A) and (B) of 3.2 mm in diameter and having chemical compositions shown in Table 2, and with a groove shown in FIG. 4.

Current source: direct, reverse polarity
Current: 450A (350A for the initial layer only)
Voltage: 28 V
Welding speed: 40 cm/min.
Torch angle: 30°
Wire extension: 25 mm
Interpass temperature: 150° C. or lower Table 1

Chemical Compositions (%) and Mechanical Properties of the Steel Plate used in Example 1

| C | Si | Mn | P | S | T.S. (kg/mm$^2$) | Y.P. (kg/mm$^2$) | El (%) | $2v^E$-30° C. (kg-m) |
|---|---|---|---|---|---|---|---|---|
| 0.09 | 0.24 | 1.41 | 0.021 | 0.005 | 51 | 44 | 40 | 24.9 |

Table 2

Chemical Compositions(%) of Welding Wires (A) & (B)

| | C | Si | Mn | P | S |
|---|---|---|---|---|---|
| (A) | 0.06 | 0.31 | 1.35 | 0.015 | 0.009 |
| (B) | 0.09 | 0.03 | 1.95 | 0.018 | 0.009 |

The flux compositions (AF, BF) used in this example are in Table 3. AF was used for the wire A and BF was used for the wire B.

In Table 4 mixing proportions of the flux components are shown in percent.

Table 3-1

| Chemical Analysis (%) of Flux AF | | | | | | | | | |
|---|---|---|---|---|---|---|---|---|---|
| | AF-1 | AF-2 | AF-3 | AF-4 | AF-5 | AF-6 | AF-7 | AF-8 | AF-9 |
| $TiO_2$ | 19.0 | 18.5 | 18.0 | 30.0 | 17.0 | 17.0 | 17.0 | 16.0 | 15.0 |
| $Al_2O_3$ | 24.0 | 21.0 | 12.0 | 15.0 | 20.0 | 20.0 | 20.0 | 1.0 | 31.0 |
| $CaF_2$ | 26.0 | 18.5 | 10.0 | 11.0 | 17.0 | 17.0 | 17.0 | 55.0 | 10.0 |
| MgO | 24.0 | 27.0 | 30.0 | 28.0 | 26.0 | 26.0 | 26.0 | 1.0 | 12.0 |
| $SiO_2$ | 3.9 | 4.5 | 9.0 | 6.0 | 4.5 | 5.2 | 7.2 | 19.5 | 3.0 |
| $B_2O_3$ | 0.1 | 0.4 | 0.3 | 0.3 | 0.4 | 0.2 | 0.3 | — | — |
| $CaCO_3$ | — | 3.2 | 11.3 | 2.7 | — | — | — | — | 25.0 |
| Deoxidizer & Alloying agent | — | 1.5 | 2.0 | 1.4 | — | 2.1 | — | 2.0 | — |
| Others* | 3.0 | 5.4 | 7.4 | 5.6 | 15.1 | 10.3 $ZrO_2$ 2.1 | 10.2 $MnO_2$ 1.8 | 5.5 | 4.0 |

Table 3-2

| Chemical Analysis(%) of Flux BF | | | | | | | | | | |
|---|---|---|---|---|---|---|---|---|---|---|
| | BF-1 | BF-2 | BF-3 | BF-4 | BF-5 | BF-6 | BF-7 | BF-8 | BF-9 | BF-10 |
| $TiO_2$ | 18.0 | 13.0 | 30.0 | 14.0 | 24.0 | 19.0 | 13.0 | 12.0 | 10.0 | 28.0 |
| $Al_2O_3$ | 16.0 | 28.0 | 12.0 | 18.0 | 17.0 | 20.0 | 15.0 | 37.0 | 8.0 | 3.0 |
| $CaF_2$ | 26.0 | 20.0 | 19.0 | 17.0 | 20.5 | 10.0 | 12.0 | 17.0 | 8.0 | 38.0 |
| MgO | 26.0 | 30.0 | 28.0 | 38.0 | 28.0 | 35.0 | 24.0 | 23.0 | 43.0 | 3.0 |
| $SiO_2$ | 3.0 | 4.0 | 4.0 | 3.0 | 7.0 | 6.0 | 7.0 | 4.0 | 21.0 | 18.0 |
| $B_2O_3$ | 0.4 | 0.4 | 0.4 | 0.4 | 0.1 | 0.8 | 0.4 | — | 0.5 | — |
| $CaCO_3$ | 0.9 | — | — | — | — | — | 5.0 | — | 1.3 | — |
| $MnO_2$ | — | — | — | 1.2 | — | — | — | — | — | 3.9 |
| Iron Powder | — | — | 2.2 | — | — | — | 20.0 | — | 0.2 | 0.2 |
| $AlF_3$ | — | — | — | — | — | 2.2 | — | — | — | — |
| LiF | — | — | — | — | 1.3 | — | — | — | — | — |
| Alloying agent | 0.5 | — | 0.7 | 0.7 | 0.5 | — | — | 1.0 | 1.5 | — |
| Deoxidizer | 0.5 | 0.5 | 0.5 | 0.7 | 0.5 | — | 1.2 | 1.7 | 1.5 | — |
| Binder | 4.0 | 2.2 | 2.5 | — | — | 2.1 | 1.4 | 4.0 | 4.0 | 4.0 |
| Others* | 3.7 | 1.9 | 0.7 | 3.2 | 1.1 | 4.9 | 1.0 | 0.3 | 0.8 | 1.9 |

*"Others" includes unavoidable impurities such as sulfides and oxides.

Table 4-1

| Mixing Proportion of Flux (AF) Components | | | | | | | | | |
|---|---|---|---|---|---|---|---|---|---|
| | AF-1 | AF-2 | AF-3 | AF-4 | AF-5 | AF-6 | AF-7 | AF-8 | AF-9 |
| Rutile sand | 19.8 | — | — | 31.3 | — | 17.7 | 17.7 | 15.6 | 15.6 |
| Titanium slag | — | 20.4 | 19.9 | — | 18.8 | — | — | — | — |
| Fluorite from floatation | 26.6 | 18.9 | — | 11.2 | 17.4 | 17.4 | 17.4 | 56.2 | — |
| Low-grade fluorite | — | — | 11.9 | — | — | — | — | — | 11.9 |
| Magnesia clinker bonded with silica | 24.7 | 27.8 | — | — | — | 26.8 | — | 1.0 | — |
| Magnesia clinker bonded with iron oxides | — | — | 32.3 | 30.1 | 28.0 | — | 28.0 | — | 12.9 |
| Industrial alumina | 24.4 | 21.3 | — | 15.2 | 20.3 | 20.3 | 20.3 | 1.0 | 31.5 |
| Murite clinker | — | — | 15.1 | — | — | — | — | — | — |
| Silica sand | 3.0 | — | 5.9 | 5.8 | — | 3.4 | 7.0 | 19.3 | 1.7 |
| Wollastonite | — | 5.9 | — | — | 6.9 | — | — | — | — |
| Lime stone | — | 3.2 | 11.4 | 2.7 | — | — | — | — | 25.2 |
| Borax | — | 0.6 | 0.4 | — | 0.60 | 0.30 | 0.4 | — | — |
| Colemanite | 0.2 | — | — | 0.6 | — | — | — | — | — |
| Arc stabilizer | — | — | — | — | — | Zirconium 3.0 | Manganese dioxide 2.3 | — | — |
| Deoxidizer | — | — | Fe-Si 1.5 | 0.7 | — | — | Fe-Si 0.5 | Fe-Si 2.0 | — |
| Alloying agent | — | Mn | 1.2 Ni | 0.5 Mn | 0.7 | — | 2.1 | — | — |
| Others | 1.3 | 0.7 | 1.1 | 1.7 | 8.0 | 9.0 | 6.4 | 4.9 | 1.2 |

Table 4-2

| Mixing Proportion of Flux (BF) Components | | | | | | | | | | |
|---|---|---|---|---|---|---|---|---|---|---|
| | BF-1 | BF-2 | BF-3 | BF-4 | BF-5 | BF-6 | BF-7 | BF-8 | BF-9 | BF-10 |
| Rutile sand | 18.8 | — | 31.3 | — | 25.0 | 19.8 | — | 12.5 | 10.4 | 29.2 |
| Titanium slag | — | 14.3 | — | 15.4 | — | — | 14.3 | — | — | — |
| Industrial alumina | 16.3 | 28.5 | 12.2 | 18.3 | 17.3 | 20.3 | 15.3 | 37.6 | 8.1 | 3.0 |
| Fluorite | 26.6 | 20.5 | 19.4 | 17.4 | 21.0 | 10.2 | 12.3 | 17.4 | 8.2 | 38.9 |
| Magnesia clinker bonded with silica | — | 30.9 | 28.8 | 39.1 | 28.8 | — | 24.7 | 23.8 | 44.3 | 3.1 |
| Magnesia clinker bonded | | | | | | | | | | |

Table 4-2-continued

| | Mixing Proportion of Flux (BF) Components | | | | | | | | | |
|---|---|---|---|---|---|---|---|---|---|---|
| | BF-1 | BF-2 | BF-3 | BF-4 | BF-5 | BF-6 | BF-7 | BF-8 | BF-9 | BF-10 |
| with iron oxides | 30.0 | — | — | — | — | 40.0 | — | — | — | — |
| Wollastonite | 1.8 | 1.0 | — | — | 2.0 | 7.3 | 0.6 | — | — | 3.0 |
| Silica sand | — | 1.5 | 2.6 | 6.6 | 4.0 | — | 3.6 | 2.0 | 17.2 | 10.0 |
| Borax | 0.6 | 0.6 | — | 0.6 | — | 1.2 | 0.6 | — | 0.8 | — |
| Colemanite | — | — | 0.8 | — | 0.2 | — | — | — | — | — |
| Lime stone | 0.9 | — | — | — | — | — | 5.0 | — | 1.3 | — |
| Manganese oxides | — | — | — | 1.2 | — | — | — | — | — | 3.9 |
| Iron powder | — | — | 2.2 | — | — | — | 20.0 | — | 0.2 | 0.2 |
| Aluminum fluoride | — | — | — | — | — | 2.2 | — | — | — | — |
| Lithium fluoride | — | — | — | — | 1.3 | — | — | — | — | — |
| Fe-Mn (78% Mn) | 0.5 | — | 0.7 | 0.7 | 0.5 | — | — | 1.0 | 1.5 | — |
| Fe-Si (77% Si) | 0.5 | 0.5 | 0.5 | 0.7 | 0.5 | — | 1.2 | 1.7 | 1.5 | — |
| Binder (solid) | 4.0 | 2.2 | 2.5 | — | — | 0.8 | 1.4 | 4.0 | 4.0 | 4.0 |

The fluxes AF-1 to AF-7 and BF-1 to BF-7 are within the scope of the present invention, while the fluxes AF-8 and AF-9, and BF-8 to BF-10 are comparative fluxes.

Comparison of the results concerning the welding performance, the oxygen content in the weld metal, the Charpy impact value and the critical COD value obtained by these fluxes is shown in Table 5. The tests for the COD value were done in accordance with the British Standard Association, DD19-1972. As understood from the table, both the welding performance and the mechanical properties of the weld metals obtained by using the fluxes AF-1 to AF-7 and BF-1 to BF-7 are excellent, while in the welding using the fluxes AF-8 and BF-10, the arc voltage severely fluctuated due to the excessive contents of $CaF_2$ and $SiO_2$, causing arc breaking, and wire sticking, and thus these fluxes could not be used for practical application.

Although the fluxes AF-9 and BF-8 could stabilize the arc, the toughness of the weld metals was poor due to the absence of $B_2O_3$, and the slag was so sticky that it was completely impossible to detach the slag.

In the case of the flux BF-9, the Charpy impact value was slightly improved due to the effect of Ti-B, but the oxygen content in the weld metal was not so lowered, and the effect of Ti and B was not so fully developed as to contribute for improvement of the COD value.

TABLE 5-1

| | | Welding Performance and Impact Values | | | | | | | | |
|---|---|---|---|---|---|---|---|---|---|---|
| | | AF-1 | AF-2 | AF-3 | AF-4 | AF-5 | AF-6 | AF-7 | AF-8 | AF-9 |
| Arc stability | | o | ◎ | ◎ | ◎ | ◎ | ◎ | ◎ | x | Δ |
| Bead shape | | o | ◎ | o | o | o | o | ◎ | Δ | o |
| Slag detachability | | o | o | o | o | o | o | o | o | x |
| Pock mark* | Horizontal | no | no | no | no | no | no | no | 10 | 16 |
| Undercut | Welding | no | no | no | no | no | no | no | no | no |
| Slag entrap-* pment | Performance | no | no | no | no | no | no | no | 13 | no |
| Pit blowhole* | | no | no | no | no | no | no | no | 1 | 19 |
| All-round performance | | o | ◎ | ◎ | o | o | o | o | x | Δ |
| Oxygen content (%) | | 0.032 | 0.033 | 0.036 | 0.045 | 0.040 | 0.033 | 0.036 | 0.012 | 0.052 |
| $v^E$–45° C. (kg-m) | | 14.5 | 19.6 | 16.6 | 7.8 | 18.8 | 8.5 | 17.5 | 3.5 | 3.8 |

◎:Excellent
o:Good
Δ:Slightly bad
x:Bad
*Numerical figures for the pock mark, the slag entrappment and the pit blowhole represent the number of occurrences per 1 m length of the bead.

TABLE 5-2

| | | Welding Performance and Material Quality | | | | | | | | | |
|---|---|---|---|---|---|---|---|---|---|---|---|
| | | BF-1 | BF-2 | BF-3 | BF-4 | BF-5 | BF-6 | BF-7 | BF-8 | BF-9 | BF-10 |
| Arc stability | | o | ◎ | ◎ | ◎ | o | o | ◎ | o | Δ | x |
| Bead shape | | ◎ | ◎ | o | o | ◎ | ◎ | o | x | o | Δ |
| Slag detachability | | ◎ | o | | o | o | o | o | x | x | o |
| Pock mark* | Horizontal | 2 | 0 | 1 | 1 | 2 | 0 | 2 | 13 | 18 | 8 |
| Undercut* | Welding | 0 | 0 | 2 | 0 | 0 | 2 | 0 | 2 | 1 | 8 |
| Slag entrappment* | Performance | 0 | 1 | 0 | 0 | 0 | 0 | 0 | 5 | 3 | 0 |
| Pit blowhole* | | 0 | 0 | 0 | 0 | 0 | 0 | 0 | 0 | 5 | 0 |
| All-round performance | | o | ◎ | o | o | o | ◎ | o | x | Δ | Δ |
| Oxygen content (%) | | 0.021 | 0.032 | 0.038 | 0.029 | 0.040 | 0.037 | 0.036 | 0.040 | 0.052 | 0.030 |
| $v^E$-50 (kg-m) | | 17.1 | 18.5 | 16.2 | 20.3 | 12.0 | 11.2 | 13.4 | 3.4 | 7.8 | 2.5 |
| δc-50 (mm)** | | 1.7 | 1.5 | 1.8 | 1.2 | 0.92 | 0.65 | 0.78 | 0.038 | 0.15 | 0.076 |

◎:Excellent
o :Good
Δ:Slightly bad
x :Bad
*:Numerical figures for the pock mark, the undercut, the slag entrappment and the pit blowhole represent the number of occurrences per 1 m length of the bead.
**:δc-50 represents the lowest value among the three critical COD values at −50° C.

EXAMPLE 2

Figure 4:
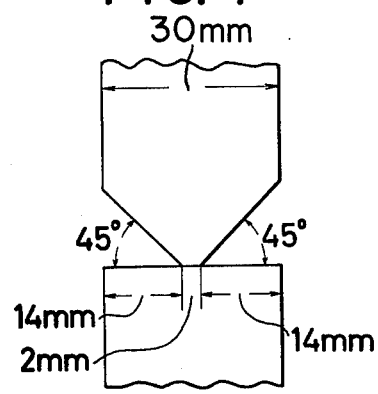
FIG. 4 shows the welding groove used in Examples 1, 2 and 6.

A multiple-pass welding of four passes was performed on both sides of HT-60 steel having chemical compositions shown in Table 6-1 and Table 6-2, with welding wires having chemical compositions shown in Table 6-1 and Table 6-2 with a groove shown in FIG. 4 by means of an AC submerged-arc welding machine for micro-wire, under the following welding conditions.

Current: 350 A
Voltage: 28–29 V
Welding speed: 50 cm/min.

Fluxes AF-2, AF-3, AF-5, AF-8 and BF-2, BF-3, BF-7, BF-9 were used and the results are shown in Table 7-1 and Table 7-2 respectively.

In the case of the fluxes AF-2, AF-3, AF-5 and BF-2, BF-3 and BF-7 sound welded joints free from defects, such as slag entrappment, pits and pock marks and having good mechanical properties could be obtained, while in the case of the fluxes AF-8 and BF-9, the arc was not stable and the resultant welded joints had many defects.

TABLE 6-1

| | Compositions of Steel Plate and Welding Wire (%) | | | | | |
|---|---|---|---|---|---|---|
| Plate Thickness and Wire Diameter | C | Si | Mn | P | S | Others |
| Steel Plate 30 mm | 0.13 | 0.31 | 1.26 | 0.017 | 0.005 | V 0.04 |
| Welding Wire 1.6 mm | 0.08 | 0.05 | 1.73 | 0.015 | 0.009 | Mo 0.42 |

TABLE 6-2

| | Compositions of Steel Plate and Welding Wire (%) | | | | | |
|---|---|---|---|---|---|---|
| Plate Thickness and Wire Diameter | C | Si | Mn | P | S | Others |
| Steel Plate 30 mm | 0.12 | 0.28 | 1.24 | 0.017 | 0.007 | V 0.03, Nb 0.02 |
| Welding Wire 1.6 mm | 0.10 | 0.03 | 1.75 | 0.015 | 0.008 | Mo 0.42 |

TABLE 7-1

| | Results of Welding Tests | | | | |
|---|---|---|---|---|---|
| | All-round Welding Performance | Tensile Properties | | | $v^E$ 0° C. (kg-m) |
| | | T.S. (kg/mm$^2$) | Y.P. (kg/mm$^2$) | El. (%) | |
| AF-2 | ◎ | 63 | 58 | 30 | 22 |
| AF-3 | ◎ | 68 | 60 | 28 | 23 |
| AF-5 | o | 62 | 58 | 35 | 19 |
| AF-8 | x | 66 | 53 | 18 | 15 |

TABLE 7-2

| | Results of Welding Tests | | | | | |
|---|---|---|---|---|---|---|
| All-round Welding Performance | Tensile Properties | | | $v^E$-20° C. (kg-m) | δc-20 (mm) |
| | T.S. (kg/mm$^2$) | Y.P. (kg/mm$^2$) | El. (%) | | |
| BF-2 | ◎ | 68 | 61 | 29 | 24.4 | 1.25 |
| BF-3 | o | 64 | 58 | 32 | 22.0 | 1.18 |
| BF-7 | o | 69 | 62 | 33 | 17.8 | 0.58 |
| BF-9 | x | 67 | 52 | 20 | 7.8 | 0.15 |

◎: Excellent
0 : Good
x : Bad

EXAMPLE 3

Figure 5:
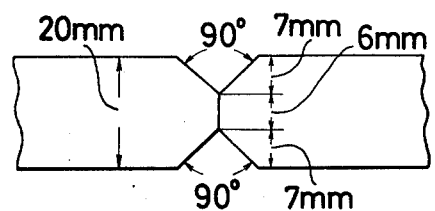
FIG. 5 shows the welding groove used in Example 3.

A multiple-pass welding in a flat position was performed on SM-50 steel plate of 20 mm thickness with three passes on each side of the sheet, using a groove shown in FIG. 5, a welding wire of 4.8 mm in diameter having a chemical composition shown in Table 2 and the flux AF-4 shown in Table 3 under the following welding conditions.

Current (AC): 650 A
Voltage: 28–29 V
Welding speed: 50 cm/min.

The result revealed that excellent welding performance can be obtained by using the flux AF-4 which is within the scope of the present invention, and the impact value in vE-45° C. of the resultant weld metal was 10.2 kg-m.

EXAMPLE 4

Figure 6:
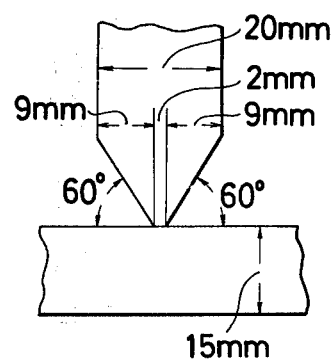
FIG. 6 shows the welding groove used in Examples 4 and 5.

A horizontal multiple-layer welding of complete joint penetration was performed on a steel plate having a chemical composition shown in Table 1 with a groove shown in FIG. 6 using the welding wire (A) of 1.6 mm in diameter shown in Table 2 and the fluxes AF-2, AF-3 and AF-9 shown in Table 3 by means of an alternating current type submerged-arc welding machine for microwire under the following welding conditions.

(a) For the initial pass
Current: 350 A
Voltage: 30 V
Welding speed: 25 cm/min.

(b) For the other passes
Current: 400 A
Voltage: 29 V
Welding speed: 40 cm/min.

The results are shown in Table 8 from which it is clearly understood that the results are very excellent in case of the fluxes AF-2 and AF-3, and thus the flux composition according to the present invention is also advantageous to such a horizontal fillet welding.

TABLE 8

| | Results of Welding Tests | | | | | | |
|---|---|---|---|---|---|---|---|
| | Welding Performance | | | | | | |
| | Arc Stability | Bead Shape | Slag Detachability | Pock Mark | Slag Entrappment | All-round Performance | $v^E$-45° C. (kg-m) |
| AF-2 | ◎ | o | ◎ | no | no | ◎ | 19.4 |
| AF-3 | ◎ | o | ◎ | no | no | ◎ | 17.5 |
| AF-9 | x | x | Δ | yes | yes | x | 2.2 |

◎: Excellent
0 : Good
Δ: Slightly bad
x : Bad

EXAMPLE 5

A horizontal multiple-layer fillet welding of complete joint penetration type was performed on a steel plate having a chemical composition shown in Table 1 with a groove shown in FIG. 6 using a welding wire of 1.6 mm in diameter having a composition shown in Table 2 and fluxes BF-2, BF-3 and BF-10 shown in Table 3 under the same welding conditions as in Example 3 by an AC submerged-arc welding machine. It has been revealed from the results shown in Table 9 that the results obtained by using the fluxes BF-2 and BF-3 were very excellent, and that the flux composition according to the present invention is also advantageous to the horizontal fillet welding.

TABLE 9

Results of Welding Tests

| | Welding Performance | | | | | | $v^E$-50° C. |
|---|---|---|---|---|---|---|---|
| | Arc Stability | Bead Shape | Slag Detachability | Pock Mark | Slag Entrapment | All-round Performance | (kg-m) |
| BF-2 | ◎ | o | o | 0/1m | 0/1m | ◎ | 19.6 |
| BF-3 | o | o | ◎ | 0/1m | 0/1m | ◎ | 18.2 |
| BF-10 | x | x | Δ | 6/1m | 12/1m | x | 2.3 |

◎: Excellent
O: Good
Δ: Slightly bad
x: Bad

EXAMPLE 6

18-pass welding with direct current and reversed polarity was performed on ASTM A387 steel of 30 mm in thickness having a chemical composition shown in Table 10 with a groove shown in FIG. 4, using a welding wire of 3.2 mm in diameter as shown in Table 10 and fluxes BF-11 to BF-13 as shown in Table 11 and Table 12 under the following welding conditions.

Current: 450 A
Voltage: 27-28 V
Welding speed: 30-50 cm/min.

The mechanical properties and chemical compositions of the resultant weld metals are shown in Table 13.

As understood from the tables, all of the results are very excellent without any cracking or other defects. Also the welding performance was excellent.

Table 10

Chemical Compositions of Steel Plate and Welding Wire (%)

| | C | Si | Mn | P | S | Cr | Mo |
|---|---|---|---|---|---|---|---|
| Plate | 0.14 | 0.35 | 0.56 | 0.007 | 0.004 | 2.32 | 0.98 |
| Wire | 0.08 | 0.02 | 0.52 | 0.013 | 0.007 | — | — |

Table 11

Compositions of Fluxes (%)

| | BF-11 | BF-12 | BF-13 |
|---|---|---|---|
| $TiO_2$ | 13.0 | 19.0 | 17.0 |
| $Al_2O_3$ | 15.0 | 15.0 | 12.0 |
| $CaF_2$ | 12.0 | 10.0 | 23.0 |
| MgO | 24.0 | 30.0 | 24.0 |
| $SiO_2$ | 7.0 | 9.0 | 5.0 |
| $B_2O_3$ | 0.4 | 0.4 | 0.2 |
| $CaCO_3$ | 12.0 | 3.0 | 5.0 |
| Iron powder | 1.8 | — | 1.0 |
| Alloying agent | 8.0 | 7.0 | 6.5 |
| Deoxidizer | 1.5 | 1.7 | 2.0 |
| Binder | 4.3 | 3.5 | 2.0 |
| Others | 1.0 | 1.2 | 2.3 |

Table 12

Mixing Proportions of Flux Materials

| | BF-11 | BF-12 | BF-13 |
|---|---|---|---|
| Rutile sand | — | 19.8 | — |
| Titanium slag | 14.3 | — | 18.6 |
| Industrial alumina | 15.3 | 15.3 | 12.2 |
| Fluorite | 12.3 | 10.2 | 23.4 |
| Magnesia clinker bonded with silica | 24.7 | 30.9 | — |
| Magnesia clinker bonded with iron oxides | — | — | 27.5 |
| Wollastonite | 0.6 | 3.0 | — |
| Silica sand | 3.6 | 4.7 | — |
| Borax | 0.6 | 0.9 | 0.3 |
| Lime stone | 12.0 | 3.0 | 5.0 |
| Iron powder | 1.8 | — | 1.0 |
| Fe-Cr (65% Cr) | 4.5 | 3.5 | 3.5 |
| Fe-Mo (62% Mo) | 2.0 | 1.5 | 1.5 |
| Fe-Mn (78% Mn) | 1.5 | 2.0 | 1.5 |
| Fe-Si (77% Si) | 1.5 | 1.7 | 2.0 |
| Binder (solid) | 4.3 | 3.5 | 3.5 |

TABLE 13

Properties of Weld Metal

| | Tensile Properties | | | Charpy Impact Value | Chemical Composition | | | | | |
|---|---|---|---|---|---|---|---|---|---|---|
| | T.S. (kg/mm$^2$) | El (%) | R.A. (%) | $v^E_0$ (kg-m) | C | Si | Mn | Cr | Mo | O |
| BF-11 | 64.2 | 27.5 | 63.8 | 21.2 | 0.09 | 0.43 | 0.72 | 2.63 | 1.09 | 0.024 |
| BF-12 | 63.8 | 20.1 | 72.5 | 19.5 | 0.07 | 0.46 | 0.85 | 2.35 | 0.94 | 0.031 |
| BF-13 | 62.9 | 18.6 | 71.5 | 17.5 | 0.08 | 0.50 | 0.71 | 2.37 | 0.98 | 0.029 |

As described hereinabove, non-fused flux composition according to the present invention is very advantageous in both technical and economical aspects because not only good bead shape and appearance can be obtained by submerged-arc welding with a direct or alternating current of low-temperature steels and high-tensile steels using a welding wire of any diameter ranging from a small diameter to an ordinary diameter, but also stabilized welding performance, sound weld joints, good mechanical properties of the weld metal, and very good detachability of slag can be obtained under a wide range of welding conditions.

What is claimed is:

1. A non-fused flux composition for submerged-arc welding which comprises 13 to 30% $TiO_2$, 12 to 28% $Al_2O_3$, 10 to 26% $CaF_2$, 24 to 40% MgO, 3 to 9% $SiO_2$ and 0.1 to 1.0% $B_2O_3$, all percentages being by weight based on the weight of the composition, the total content of the above components being 70 to 97% by weight based on the weight of the composition.

2. A non-fused flux composition according to claim 1, which further comprises not more than 15% by weight of $CaCO_3$ based on the weight of the composition.

3. A non-fused flux composition according to claim 1, which further comprises at least one member selected from the group consisting of carbonates of Ca, Ba, Sr, Na, K and Mn.

* * * * *